United States Patent
Hung

(10) Patent No.: US 10,463,935 B1
(45) Date of Patent: Nov. 5, 2019

(54) BALL THROWING SYSTEM

(71) Applicant: Ao Jie Plastic Toys Factory Ltd., Kowloon (HK)

(72) Inventor: Wen Yu Hung, Kowloon (HK)

(73) Assignee: Ao Jie Plastic Toys Factory Ltd., Kowloon (HK)

( * ) Notice: Subject to any disclaimer, the term of this patent is extended or adjusted under 35 U.S.C. 154(b) by 0 days.

(21) Appl. No.: 16/251,050

(22) Filed: Jan. 17, 2019

(51) Int. Cl.
A63B 59/20 (2015.01)
A63B 65/12 (2006.01)
A63B 60/12 (2015.01)
A63B 47/02 (2006.01)
A01K 15/02 (2006.01)

(52) U.S. Cl.
CPC ............ *A63B 65/122* (2013.01); *A63B 47/02* (2013.01); *A63B 60/12* (2015.10); *A01K 15/025* (2013.01); *A63B 59/20* (2015.10)

(58) Field of Classification Search
CPC .............................. A63B 59/20; A01K 15/025
USPC .................................. 473/510–513; 119/707
See application file for complete search history.

(56) References Cited

U.S. PATENT DOCUMENTS

| | | | | |
|---|---|---|---|---|
| 1,022,186 A | * | 4/1912 | Engler | A63B 59/20 473/509 |
| 2,025,995 A | * | 12/1935 | Lerch | A63B 59/20 473/509 |
| 2,029,790 A | * | 2/1936 | Bernhard | A63B 60/00 473/513 |
| 2,075,372 A | * | 3/1937 | Taylor | A63B 59/20 473/513 |
| 3,111,314 A | * | 11/1963 | Topper | A63B 69/0002 124/16 |
| 3,115,129 A | * | 12/1963 | Merriman | A63B 59/20 124/5 |
| 3,115,342 A | * | 12/1963 | Webster | A63B 60/38 124/5 |
| 3,170,688 A | * | 2/1965 | Porter | A63B 60/06 473/503 |
| 3,236,521 A | * | 2/1966 | Knott | A63B 60/38 124/1 |
| 3,392,978 A | * | 7/1968 | Wiest, Jr. | A63B 67/083 473/509 |
| 3,819,179 A | * | 6/1974 | Ambler, Jr. | A63B 60/38 473/457 |
| 3,887,184 A | * | 6/1975 | Cavaliere | A63B 67/083 473/515 |

(Continued)

FOREIGN PATENT DOCUMENTS

EP         3 146 838         2/2018

*Primary Examiner* — Mark S Graham
(74) *Attorney, Agent, or Firm* — LaMorte & Associates, P.C.

(57) ABSTRACT

A throwing system for throwing and catching a ball of a first diameter. A scoop is provided that has a basket and a handle. The basket has a first end, a second end, a bottom surface and an open top, wherein the handle extends from the second end of the basket. A loading hole is disposed through the bottom surface of the basket. A flap or other obstruction is provided that at least partially obstructs the loading hole. The obstruction prevents the ball from passing through the loading hole in one direction. The ball is loaded into the scoop by simply pressing the scoop over the ball so that the ball passes through the loading hole and into the basket. Once in the basket, the ball can be thrown from the scoop in a traditional manner.

17 Claims, 6 Drawing Sheets

(56) References Cited

U.S. PATENT DOCUMENTS

| | | | | |
|---|---|---|---|---|
| 4,045,026 | A * | 8/1977 | Gillespie | A63B 59/20 |
| | | | | 473/465 |
| 4,273,339 | A * | 6/1981 | Fortunato | A63B 60/12 |
| | | | | 473/513 |
| 4,302,017 | A * | 11/1981 | Huqueriza | A63B 60/00 |
| | | | | 473/510 |
| 4,374,590 | A * | 2/1983 | Everlith | A63B 59/20 |
| | | | | 473/513 |
| 4,502,690 | A * | 3/1985 | Ruperto | A63B 60/52 |
| | | | | 473/513 |
| 5,024,435 | A * | 6/1991 | Robbins | A63B 65/122 |
| | | | | 473/457 |
| 5,290,039 | A | 3/1994 | Cornelio | |
| 6,241,629 | B1 * | 6/2001 | Otto | A63B 69/0002 |
| | | | | 124/5 |
| 7,935,009 | B2 * | 5/2011 | Mullin | A63B 47/02 |
| | | | | 473/457 |
| 9,149,695 | B2 * | 10/2015 | Evans | A63B 65/122 |
| 9,278,269 | B2 * | 3/2016 | Chen | A63B 47/002 |
| 2005/0143202 | A1 * | 6/2005 | Orlowski | A63B 65/12 |
| | | | | 473/509 |
| 2008/0004140 | A1 * | 1/2008 | Matsumoto | A01K 15/025 |
| | | | | 473/513 |

* cited by examiner

BALL THROWING SYSTEM

BACKGROUND OF THE INVENTION

1. Field of the Invention

In general, the present invention relates to handheld devices that are used to throw a ball. More particularly, the present invention relates to handheld devices with baskets that can be used to both lift a ball off the ground and throw the ball at an increased velocity.

2. Prior Art Description

There are many devices that can be used to help a person throw a ball farther and faster. Many such devices are configured as a scoop, that includes a basket for holding a ball and a handle for manipulating the basket. Many different forms of the scoop exist for throwing and catching a ball. For example, the sports of lacrosse and jai alai both have specialized scoops for throwing and catching balls.

Scoops are also commonly used to throw balls to dogs. This is because a scoop not only enables a person to throw the ball farther abut enables a person to lift the ball without having to touch the ball with his/her hands. In this manner, the dog has to run farther to retrieve the ball and the person playing with the dog does not have to touch the dog's saliva present on the ball. Scoops specifically designed to throw balls to pets are exemplified by U.S. Pat. No. 5,290,039 to Cornelio and European Patent No. 3,146,838 to Ren.

Regardless of whether a scoop is used for a sport or if it is used for throwing a ball to a dog, there is a common problem shared by prior art scoops. That is, it takes a good level of skill to use the scoop to lift a stationary ball from the ground. In order to lift a ball from the ground, the end scoop must be just under the ball without inadvertently moving the ball up and away from the scoop. This maneuver is difficult to master. As a result, many people inadvertently knock the ball away from the scoop as they attempt to capture the ball with the scoop.

A need therefore exists for an improved scoop design that enables a person to capture a ball within a scoop more consistently and with less practiced skill. This need is met by the present invention as described and claimed below.

SUMMARY OF THE INVENTION

The present invention is a throwing system for throwing and catching a ball of a first diameter. A scoop is provided that has a basket and a handle. The basket has a first end, a second end, a bottom surface and an open top, wherein the handle extends from the second end of the basket.

A loading hole is disposed through the bottom surface of the basket. The loading hole has a second diameter that is larger than the first diameter of the ball. A flap or other obstruction is provided that at least partially obstructs the loading hole. The obstruction prevents the ball from passing through the loading hole in one direction. As such, the ball cannot fall through the loading hole once within the basket.

The ball is loaded into the scoop by simply pressing the scoop over the ball so that the ball passes through the loading hole and into the basket. Once in the basket, the ball can be thrown from the scoop in a traditional manner.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention throwing system can be embodied in many ways, only two exemplary embodiments are illustrated. The two exemplary embodiments are being shown for the purposes of explanation and description. The exemplary embodiments are selected in order to set forth two of the best modes contemplated for the invention. The illustrated embodiments, however, are merely exemplary and should not be considered as limitations when interpreting the scope of the appended claims.

Figure 1:
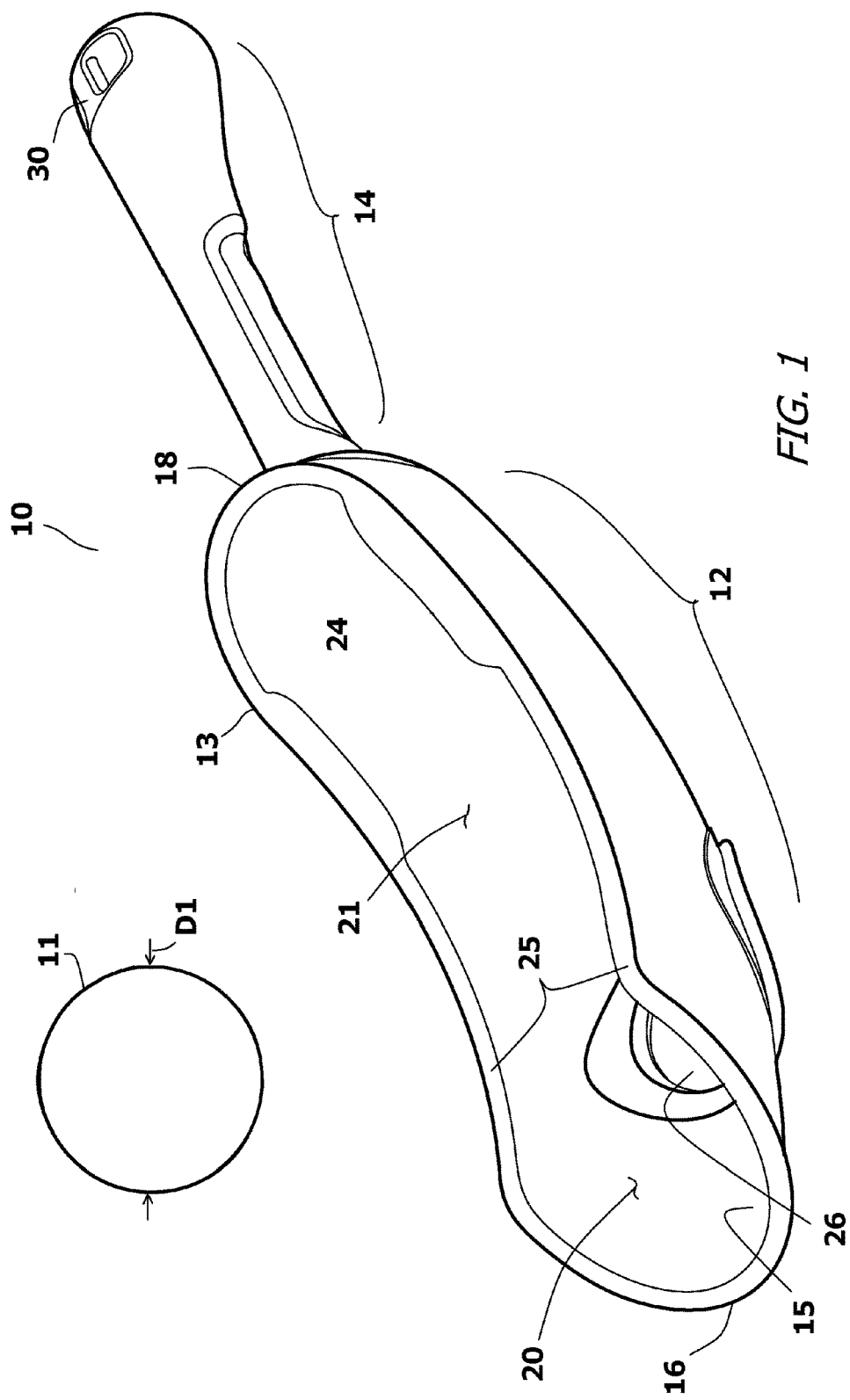
FIG. 1 is a perspective view of an exemplary embodiment of a throwing system that has a scoop and a ball.
Figure 2:
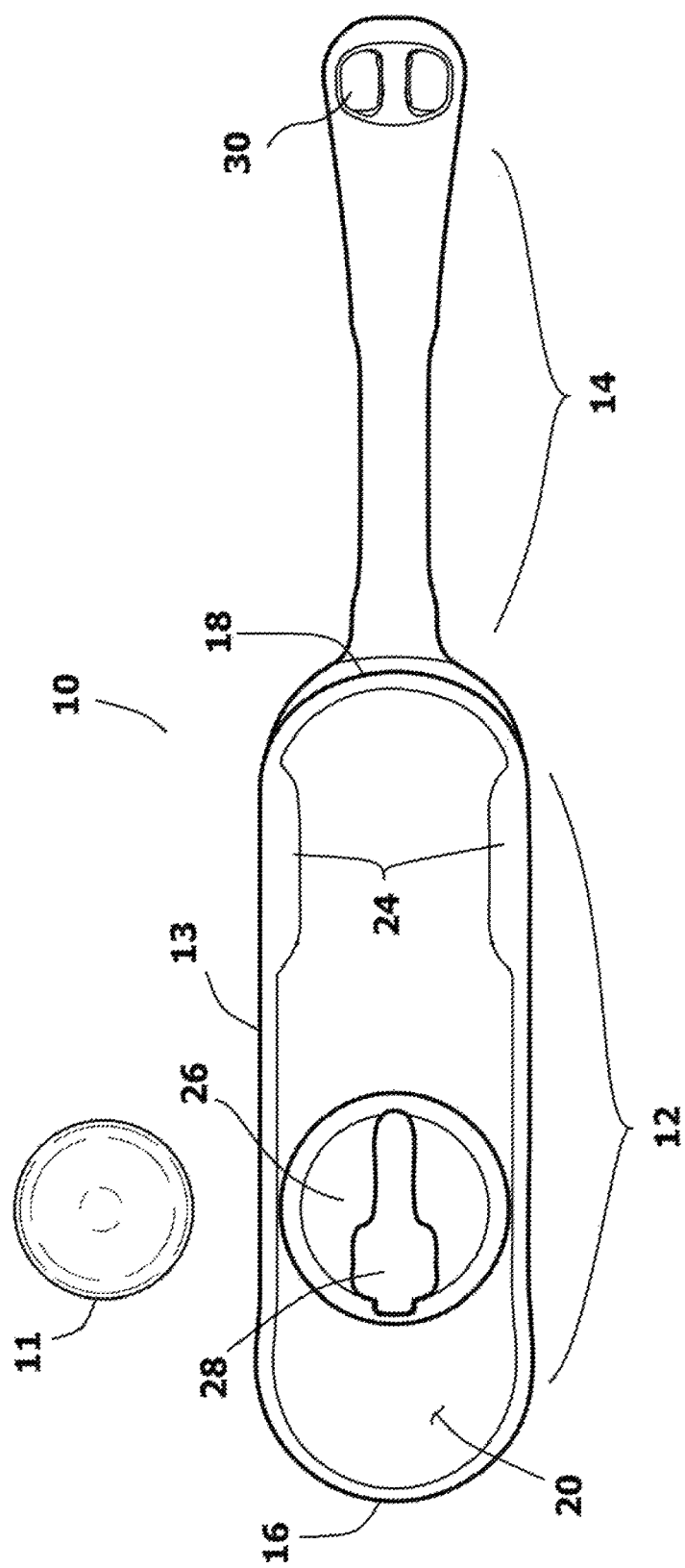
FIG. 2 is a top view of the exemplary embodiment of the throwing system with the ball positioned outside the basket of the scoop.

Referring to FIG. 1 and FIG. 2, a throwing system 10 is shown. The throwing system 10 includes a ball 11 and a scoop 13 for throwing and catching the ball 11. The scoop 13 has a basket 12 and a handle 14. The basket 12 has a concave bottom surface 15 that curves slightly as it progresses between a first end 16 and an opposite second end 18. The basket 12 also has an open top 21 between the first end 16 and the second end 18 that exposes a curved trough 20 within the basket 12. The scoop 13 is intended to be used to throw a ball 11 with a diameter D1. The curved trough 20 within the basket 12 is sized to receive and hold the ball 11. As such, the curvature of the trough 20 and the width of the open top 21 are both larger than the diameter D1 of the ball 11 in order to accommodate the ball 11.

The curved trough 20 is sized to hold the ball 11. The first end 16 of the basket 12 is open. This enables the scoop 13 to launch the ball 11 out of the curved trough 20 through the open first end 16. The open first end 16 also enables the basket 12 to scoop the ball 11 off the ground and into the curved trough 20 in a traditional manner. The second end 18 of the basket 12 is closed and connects to the handle 14. In this manner, the ball 11 can be held at the second end 18 of the basket 12 within the curved trough 20 at the beginning of a throwing action. The open top 21 of the basket 12 is defined between two parallel rims 25. Winged projections 24 may be provided on the basket 12 along the parallel rims 25 near the closed second end 18. This inhibits the ball 11 from accidentally falling out of the basket 12 prior to the ball 11 being thrown.

Figure 3:
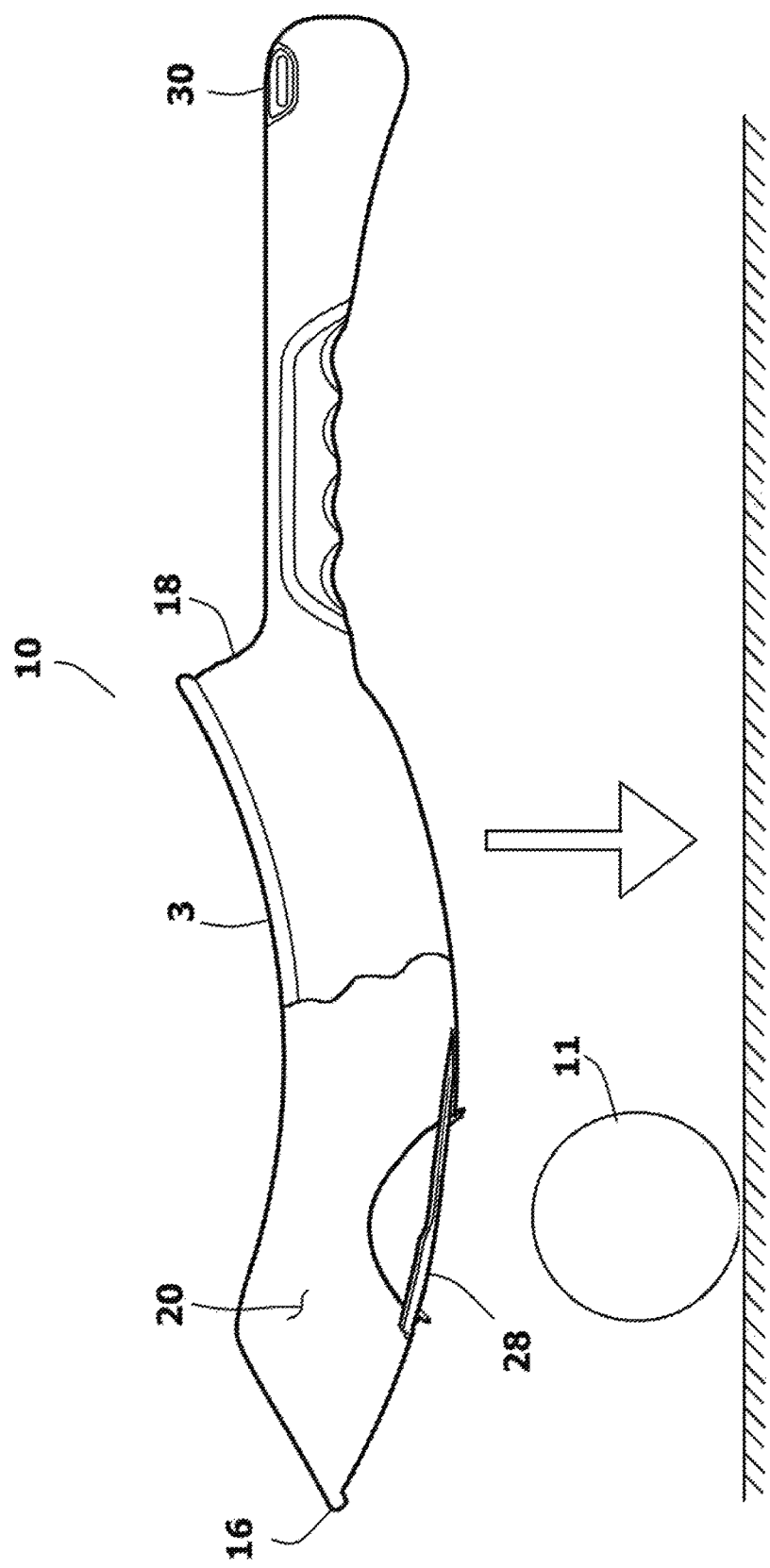
FIG. 3 is a partially cross-sectioned view of the scoop prior to receiving the ball through the loading hole.
Figure 4:
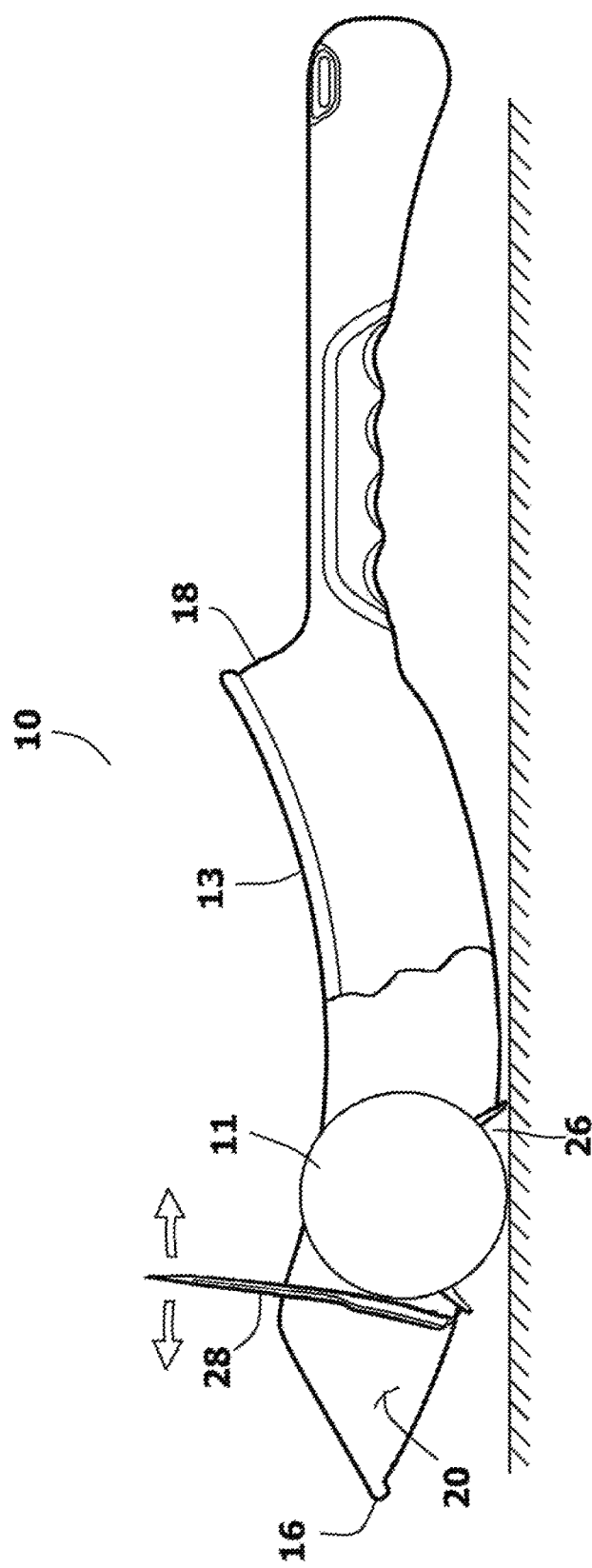
FIG. 4 is a partially cross-sectioned view of the scoop while receiving the ball through the loading hole.

Referring to FIG. 3, and FIG. 4 in conjunction with FIG. 1 and FIG. 2, it can be seen that a loading hole 26 is formed through the basket 12 within the curved trough 20. The loading hole 26 is located between the first end 16 and the second end 18 of the basket 12 at some point between the center of the basket 12 and the first end 16. The loading hole 26 is round and has an inside diameter that is larger than the diameter D1 of the ball 11.

An obstruction is provided that extends over at least part of the loading hole 26. The obstruction prevents the ball 11 from passing through the loading hole 26 in one direction.

In the shown embodiment, the obstruction is a flap 28. The flap 28 has a hinged connection 29 that enables the flap 28 to move between an open position and a closed position. The flap 28 is preferably spring biased into the closed position. As an alternative option, the flap 28 may be locked into the closed position, wherein the flap 28 will only unlock if a mechanical activator 30 on the handle 14 is manipulated.

As is shown in FIG. 3, a ball 11 resting on a surface can be loaded into the throwing system 10 through the loading hole 26. The loading hole 26 in the basket 12 is positioned over the ball 11. The entire throwing system 10 is then moved vertically down atop the ball 11. As the ball 11 enters the loading hole 26, the ball 11 displaces the flap 28 upwardly. Eventually, the ball 11 completely transits the loading hole 26 and the flap 28 pushes the ball 11 toward the second end 18 of the curved trough 20. Once the ball 11 is clear of the loading hole 26, the flap 28 closes and blocks the loading hole 26. The ball 11 is therefore positioned within the curved trough 20 and cannot fall out of the curved trough 20 through the loading hole 26.

Figure 5:
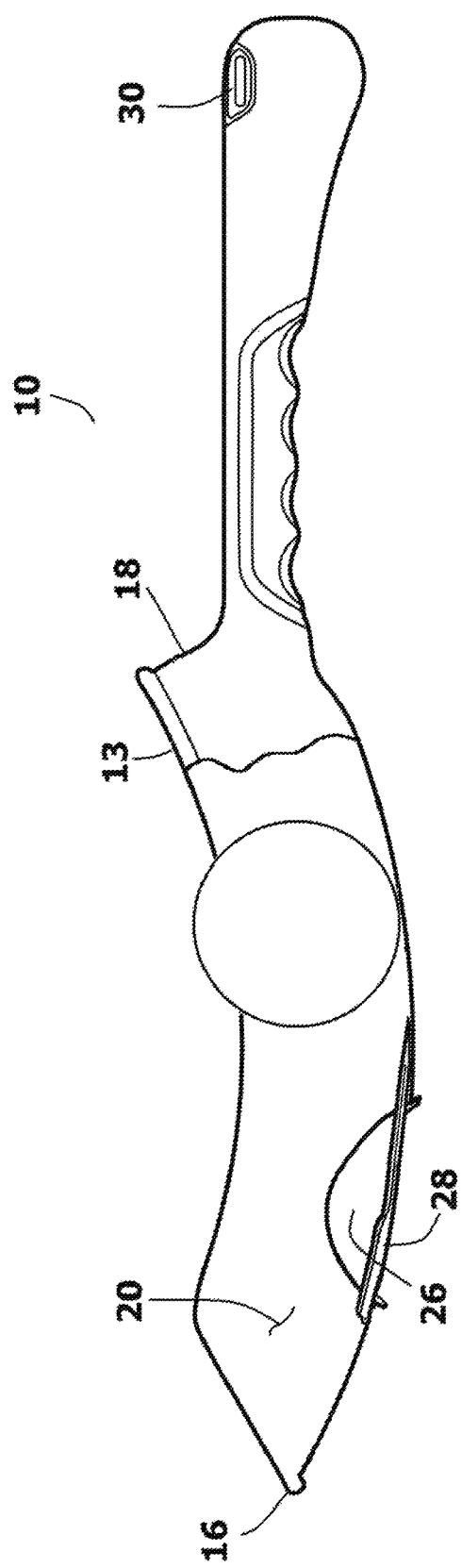
FIG. 5 is a partially cross-sectioned view of the scoop having received the ball in the basket.

As can be seen from FIG. 5, once the ball 11 is in the curved trough 20 and the flap 28 is in its closed position, the throwing system 10 is loaded and ready to launch. By flicking the scoop 13 by the handle 14, the ball 11 can be caused to travel through the curved trough 20 and out the open first end 16 with speed.

Figure 6:
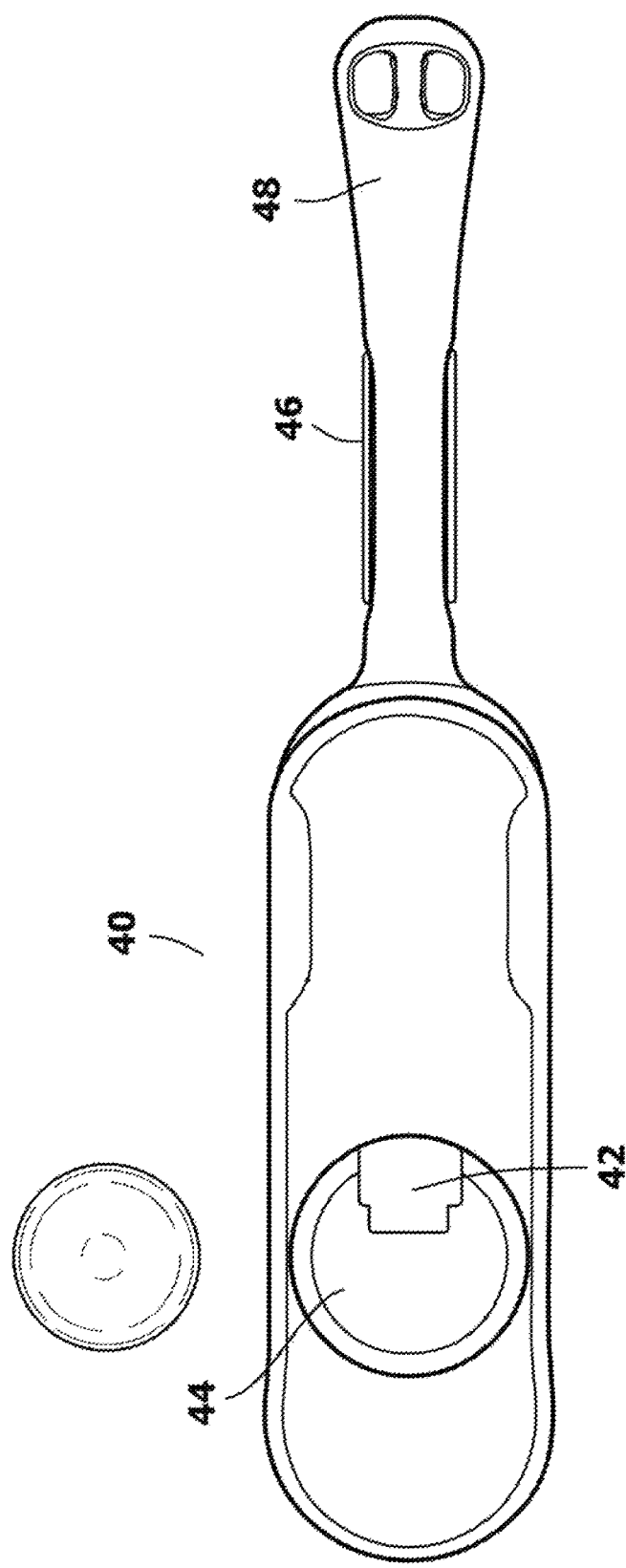
FIG. 6 is a top view of an alternate embodiment of the scoop having a different obstruction for the loading hole.

Referring to FIG. 6, an alternate embodiment of a throwing system 40 is shown. In this embodiment, the flap used in the previous embodiment to block the loading hole 44 is replaced by a retractable tab 42. The retractable tab 42 extends into the loading hole 44 and blocks the ball 11 from passing through the loading hole 44. The retractable tab 42 can be retracted by depressing a mechanical activator 46 on the handle 48.

It will be understood that the embodiments of the present invention that are illustrated and described are merely exemplary and that a person skilled in the art can make many variations to those embodiments. For instance, the length, width and curvature of the basket can be changed to accommodate different sized balls. Likewise, various one-way flap configurations can be used to selectively block the loading hole. All such embodiments are intended to be included within the scope of the present invention as defined by the claims.

What is claimed is:

1. A throwing device for throwing a ball of a first diameter, said throwing device comprising;
    a basket that extends between a first end and an opposite second end, said basket having a bottom surface and an open top;
    a handle extending from said second end of said basket;
    a loading hole disposed through said bottom surface of said basket at a point between said first end and said second end; and
    a flap obstructing at least part of said loading hole, wherein said flap is configured to enable passage of said ball through said loading hole in only one direction.

2. The device according to claim 1, wherein said bottom surface of said basket is curved between said first end and said second end.

3. The device according to claim 1, wherein said flap is selectively movable between an open position and a closed position, wherein said ball is capable of passing fully through said loading hole only when said flap is in said open position.

4. The device according to claim 3, wherein said flap is biased into said closed position.

5. The device according to claim 3, further including a lock for selectively locking said flap into said closed position.

6. The device according to claim 5, further including a release for said lock, wherein said release is disposed on said handle.

7. The device according to claim 1, wherein said basket defines a trough between said first end and said second end, wherein said trough is defined in part by parallel rims that extend from said first end to said second end.

8. The device according to claim 7, further including flares on said parallel rims proximate said second end that decrease said open top of said basket.

9. A throwing system, comprising;
    a ball of a first diameter;
    a scoop having a basket and a handle, wherein said basket has a first end, a second end, a bottom surface and an open top, and wherein said handle extends from said second end of said basket;
    a loading hole disposed through said bottom surface of said basket, wherein said loading hole has a second diameter that is larger than said first diameter of said ball; and
    an obstruction that prevents said ball from passing through said loading hole in only one direction.

10. The system according to claim 9, wherein said bottom surface of said basket is curved between said first end and said second end.

11. The system according to claim 9, wherein said obstruction is selectively movable between an open position and a closed position, wherein said ball is capable of passing fully through said loading hole only when said obstruction is in said open position.

12. The system according to claim 11, wherein said obstruction is biased into said closed position.

13. The system according to claim 11, further including a lock for selectively locking said obstruction into said closed position.

14. The system according to claim 13, further including a release for said lock, wherein said release is disposed on said handle.

15. The system according to claim 9, wherein said basket defines a trough between said first end and said second end, wherein said trough is defined in part by parallel rims that extend from said first end to said second end.

16. The system according to claim 15, further including flares on said parallel rims proximate said second end that decrease said open top of said basket.

17. The system according to claim 15, wherein said trough is curved between said first end and said second end.

* * * * *